(12) United States Patent
Lee (10) Patent No.: US 12,104,645 B2
(45) Date of Patent: Oct. 1, 2024

(54) BALL RETAINER

(71) Applicant: ChuanYu Lee, New Taipei (TW)

(72) Inventor: ChuanYu Lee, New Taipei (TW)

(*) Notice: Subject to any disclaimer, the term of this patent is extended or adjusted under 35 U.S.C. 154(b) by 91 days.

(21) Appl. No.: 18/188,239

(22) Filed: Mar. 22, 2023

(65) Prior Publication Data

US 2024/0191755 A1 Jun. 13, 2024

(30) Foreign Application Priority Data

Dec. 7, 2022 (CN) .......................... 202223268638.2

(51) Int. Cl.
*F16C 33/38* (2006.01)
*F16G 3/00* (2006.01)
*F16G 3/06* (2006.01)
*F16G 3/14* (2006.01)

(52) U.S. Cl.
CPC ............ *F16C 33/3812* (2013.01); *F16G 3/00* (2013.01)

(58) Field of Classification Search
CPC ........ F16C 33/38; F16C 33/3812; F16G 3/00; F16G 3/06; F16G 3/14
USPC .................................................. 198/845, 850
See application file for complete search history.

(56) References Cited

U.S. PATENT DOCUMENTS

| | | | | |
|---|---|---|---|---|
| 2,255,733 A | * | 9/1941 | Lathrop | F16G 13/07 198/850 |
| 3,069,923 A | * | 12/1962 | Lengyel | F16G 13/07 474/212 |
| 4,239,304 A | * | 12/1980 | Wakunami | F16C 33/504 384/573 |
| 4,397,507 A | * | 8/1983 | Kraus | F16C 33/4635 384/577 |
| 4,815,270 A | * | 3/1989 | Lapeyre | F16G 13/07 59/900 |
| 4,882,901 A | * | 11/1989 | Lapeyre | B65G 17/08 59/900 |

(Continued)

FOREIGN PATENT DOCUMENTS

| | | |
|---|---|---|
| DE | 3041860 A1 | 6/1982 |
| DE | 102017109529 A1 * | 11/2018 |

(Continued)

OTHER PUBLICATIONS

US 2016/0192745 A1, Lauren, Jul. 7 (Year: 2016).*

*Primary Examiner* — Douglas A Hess
(74) *Attorney, Agent, or Firm* — INNOVATION CAPITAL LAW GROUP, LLP; Vic Lin (57) ABSTRACT

A ball retainer includes a chain belt, a hook, and a slot portion. The hook is arranged on the first end of the chain belt. The hook includes a neck portion, a hook body, two leaning protrusions, and a limiting protrusion. The hook body is connected to the neck portion. The two leaning protrusions extend outward along the short side direction of the chain belt toward two sides of the hook body, respectively. The slot portion is arranged on the second end of the chain belt. The slot portion includes a slot, two abutting portions, a connecting portion, and a receiving portion. After the hook is correspondingly engaged with the slot portion, the hook body is accommodated in the slot, the two leaning protrusions correspondingly lean against the two abutting portions, the neck portion leans against the connecting portion, and the limiting protrusion is correspondingly accommodated in the receiving portion.

11 Claims, 9 Drawing Sheets

(56) References Cited

U.S. PATENT DOCUMENTS

| | | | | |
|---|---|---|---|---|
| 5,009,630 A * | 4/1991 | Kanehira | ............... | F16G 13/07 |
| | | | | 474/227 |
| 7,234,589 B2 * | 6/2007 | Sedlacek | ............... | B65G 21/22 |
| | | | | 198/840 |
| 8,113,340 B1 * | 2/2012 | Smith | ................... | B65G 17/40 |
| | | | | 198/853 |
| 10,480,579 B2 * | 11/2019 | Houdayer | ............. | F16C 33/467 |
| 12,006,970 B2 * | 6/2024 | Lee | ........................ | F16G 3/02 |

FOREIGN PATENT DOCUMENTS

| | | | | |
|---|---|---|---|---|
| EP | 3964729 A1 | 3/2022 | | |
| WO | WO-2006088349 A1 * | 8/2006 | .............. | E21F 13/08 |

\* cited by examiner

BALL RETAINER

CROSS-REFERENCE TO RELATED APPLICATION

This non-provisional application claims priority under 35 U.S.C. § 119(a) to Patent Application No. 202223268638.2 filed in China, P.R.C. on Dec. 7, 2022, the entire contents of which are hereby incorporated by reference.

BACKGROUND

Technical Field

The instant disclosure relates to a ball retainer, in particular, a ball retainer with a hook structure.

Related Art

A ball retainer structure as known has many connection types, such as bolt connection, concave-convex connection, ball joint connection and so on. However, a chain belt formed by these structures is connected end to end. Therefore, during the running of the chain belt, the chain and the rolling elements may pulled by each other. Especially, when the chain belt is running to a turning portion, if there is no connection structure with sufficient strength, the two ends of the chain belt will be unhooked and separated from each other, so that the rolling elements will not run smoothly or will produce abnormal noises.

SUMMARY

In view of this, according to one embodiment, a ball retainer is provided and comprises a chain belt, a hook, and a slot portion. The chain belt has a first end and a second end opposite to the first end. A plurality of accommodating portions is between the first end and the second end. The hook is arranged on the first end of the chain belt. The hook comprises a neck portion, a hook body, two leaning protrusions, and a limiting protrusion. The neck portion extends outward from the first end along a long side direction of the chain belt. The hook body is connected to the neck portion, and a width of the hook body along a short side direction of the chain belt gradually decreases from a side of the neck portion to a direction away from the neck portion. The two leaning protrusions are arranged at a joint portion between the hook body and the neck portion, and the two leaning protrusions extend outward along the short side direction of the chain belt toward two sides of the hook body, respectively. The limiting protrusion extends outward from an end surface of the hook body away from the first end of the chain belt along the long side direction of the chain belt. The slot portion corresponds to the hook and is arranged on the second end of the chain belt. The slot portion comprises a slot, two abutting portions, a connecting portion, and a receiving portion. The slot has an opening side and a limiting side opposite to the opening side. The two abutting portions and the connecting portion are on the opening side, the two abutting portions extend inward from the slot along the short side direction of the chain belt, the connecting portion is connected to the two abutting portions, and the receiving portion is on the limiting side. After the hook is correspondingly engaged with the slot portion, the hook body is accommodated in the slot, the two leaning protrusions correspondingly lean against surfaces of the two abutting portions facing the limiting side, the neck portion leans against the connecting portion, and the limiting protrusion is correspondingly accommodated in the receiving portion.

In some embodiments, the slot portion further comprises a guiding recess on the limiting side, and the end surface of the hook body is slidably disposed on the guiding recess.

In some embodiments, the chain belt further comprises a hollow portion on the first end.

In some embodiments, the chain belt, the hook, and the slot are formed by covering an elastic material with a fiber material through injection molding.

In some embodiments, each of the plurality of accommodating portions is configured to accommodate a rolling body.

In some embodiments, after the hook is correspondingly engaged with the slot portion, an outer peripheral side and an inner peripheral side corresponding to the outer peripheral side are formed, and the limiting protrusion and the receiving portion are on the inner peripheral side.

In some embodiments, an extension length of the hook body along the long side direction is 0.4 to 0.45 times the maximum distance of the accommodating portion along the long side direction.

In some embodiments, after the hook is correspondingly engaged with the slot, an outer peripheral side and an inner peripheral side corresponding to the outer peripheral side are formed, and a distance from an end point of the hook body adjacent to the first end side and on the inner peripheral side to a positioning point on the end surface is 0.45 to 0.5 times the maximum distance of the accommodating portion along the long side direction.

In some embodiments, the slot portion has a positioning recess corresponding to the positioning point.

In some embodiments, a thickness of the hook body is 0.475 to 0.525 times the maximum distance of the accommodating portion along the long side direction.

In some embodiments, a depth of the slot is 0.525 to 0.575 times the maximum distance of the accommodating portion along the long side direction.

As above, according to the ball retainer of one or some embodiments of the instant disclosure, After the hook is correspondingly engaged with the slot portion, the receiving portion limits the movement of the limiting protrusion, the surface of the hook body connected to the neck portion leans against the connecting portion, and the two leaning protrusions lean against the two abutting portions. In this way, the hook body is limited in multiple directions, thereby increasing the connection strength between the hook and the slot portion, and thus preventing the hook from detaching out of the slot portion.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
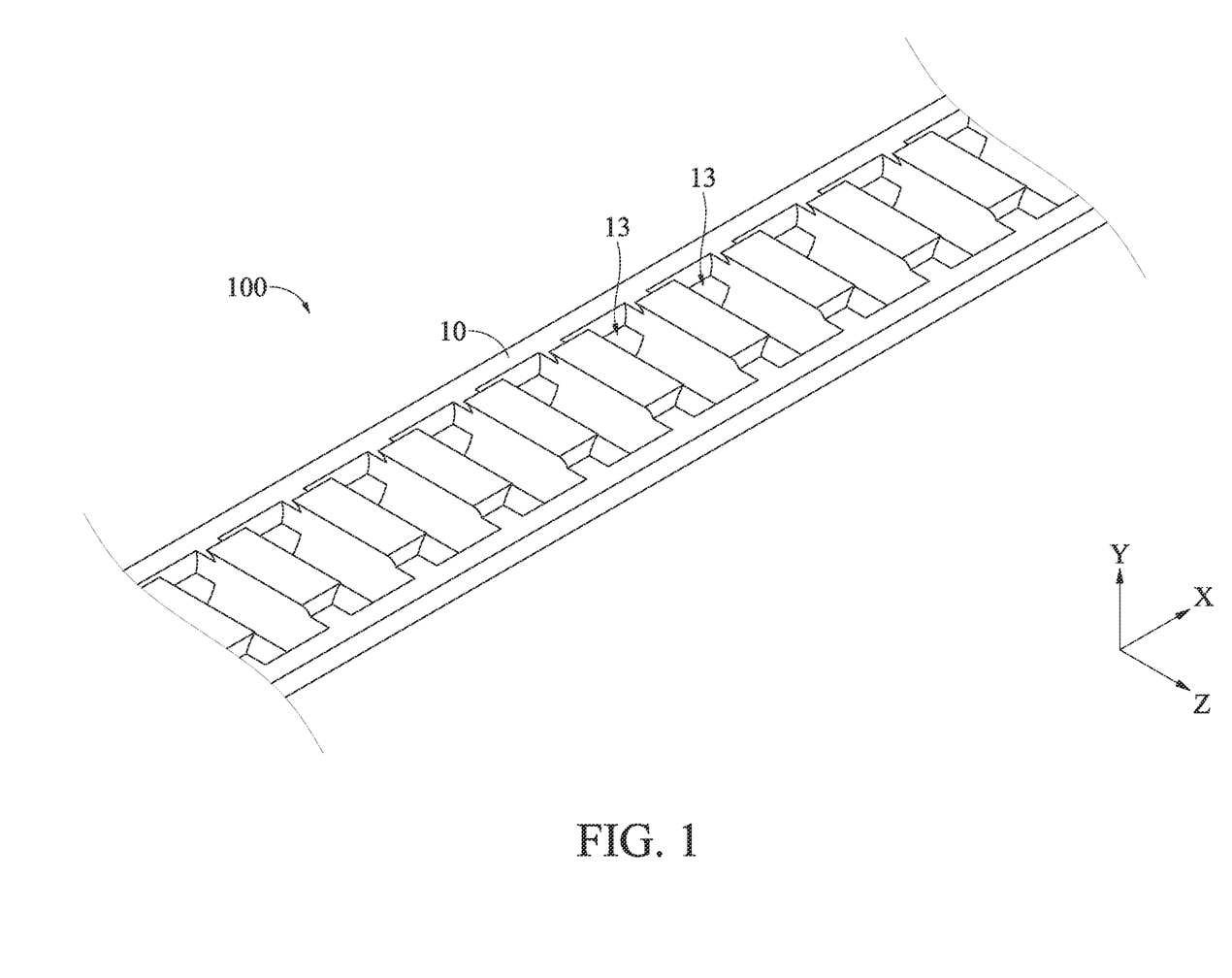
FIG. 1 illustrates a schematic view of a chain belt of a ball retainer according to a first embodiment of the instant disclosure.
Figure 2:
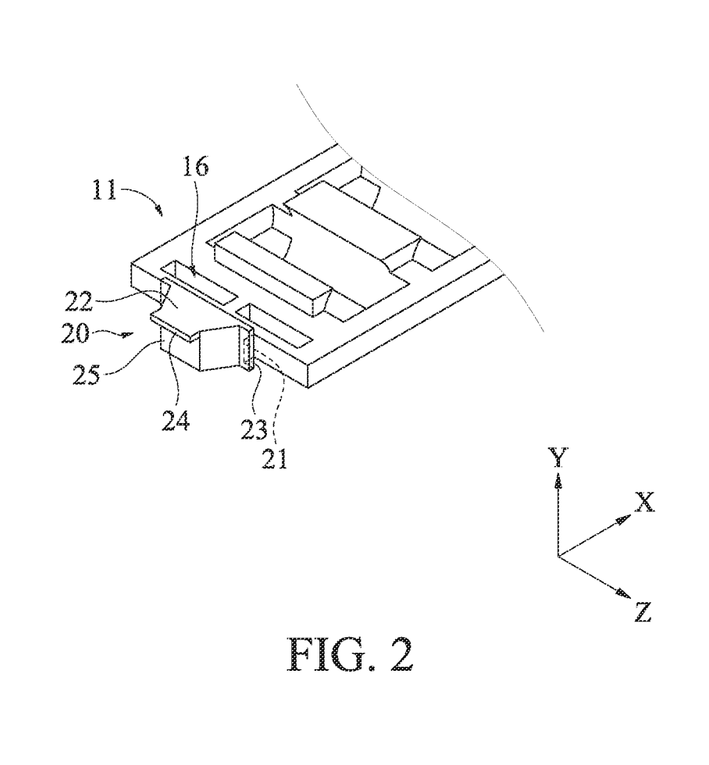
FIG. 2 illustrates a schematic view of a hook of the ball retainer according to the first embodiment of the instant disclosure.
Figure 3:
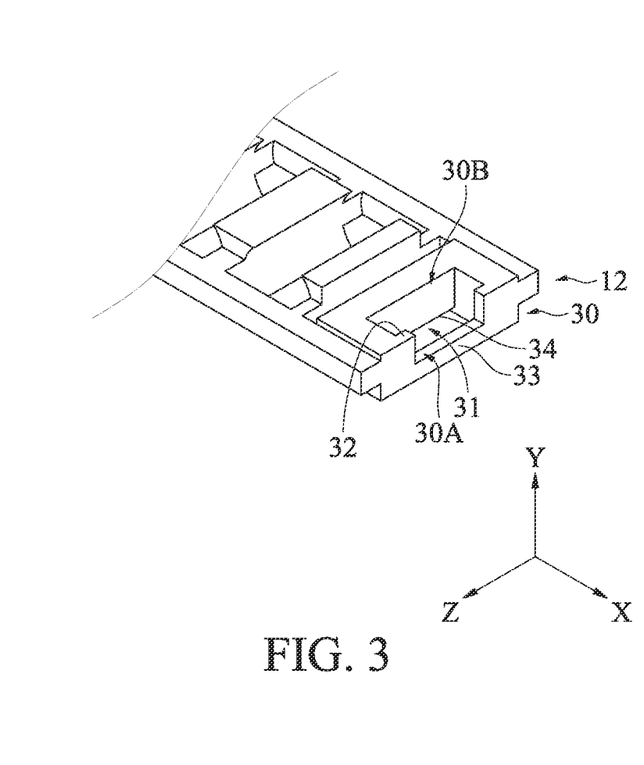
FIG. 3 illustrates a schematic view of a slot portion of the ball retainer according to the first embodiment of the instant disclosure.
Figure 4:
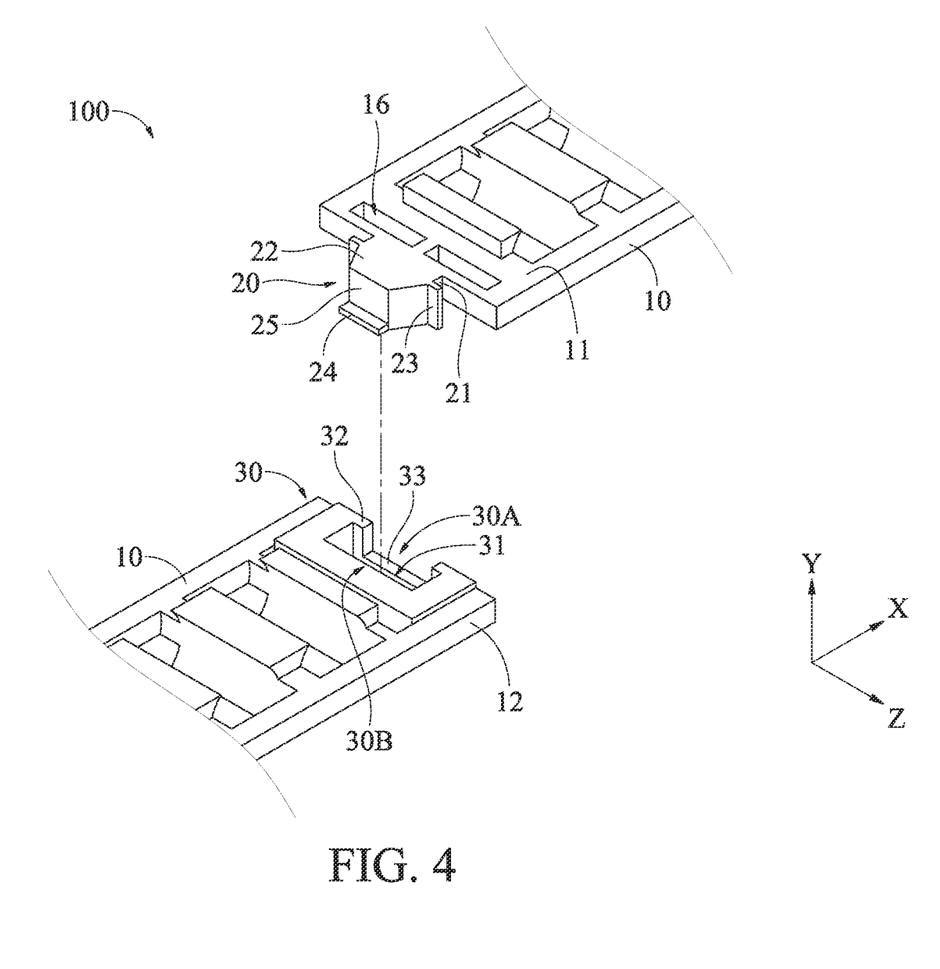
FIG. 4 illustrates an engaged schematic view of the ball retainer according to the first embodiment of the instant disclosure.
Figure 5:
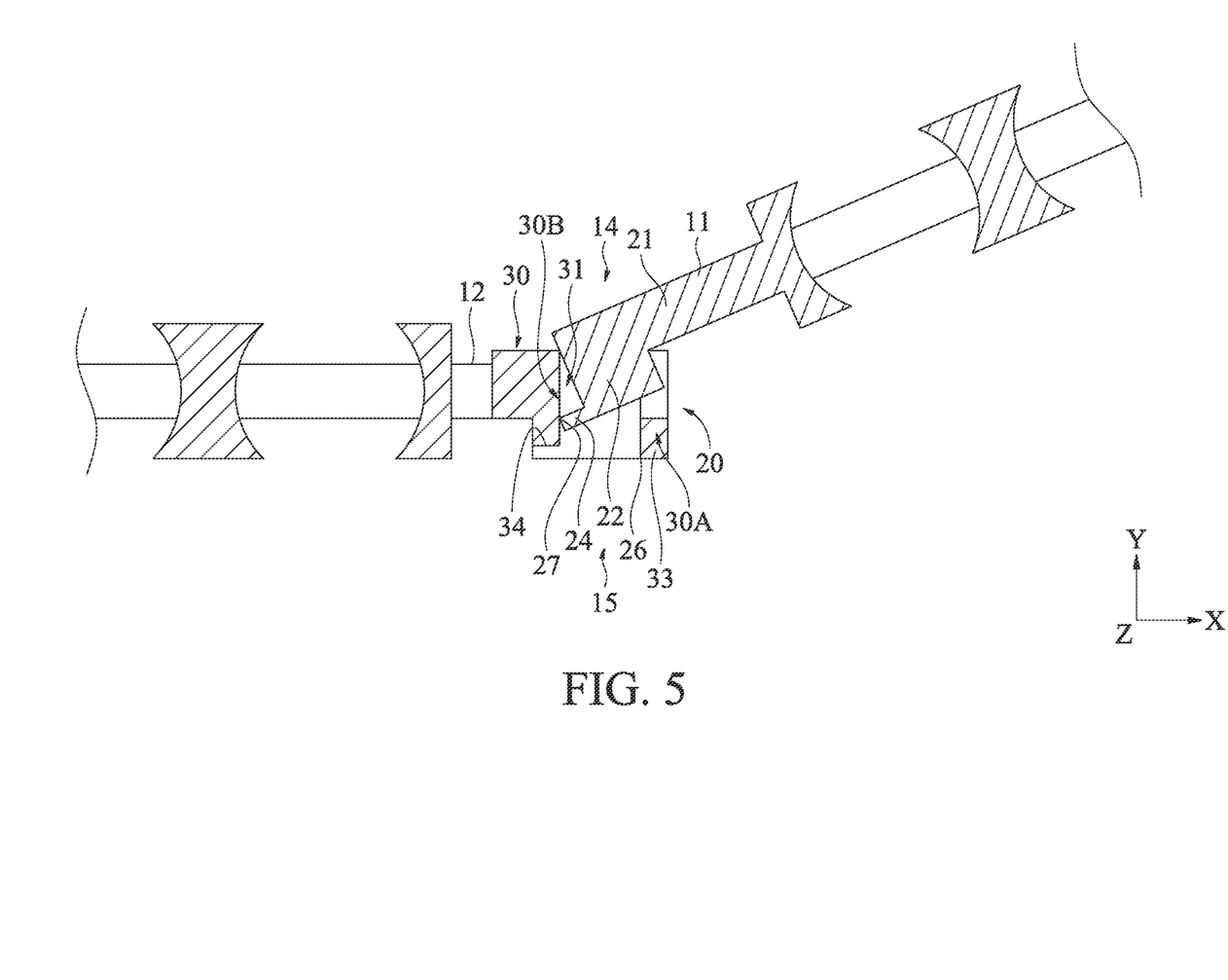
FIG. 5 illustrates a cross-sectional view (1) of the engaged state of the ball retainer according to the first embodiment of the instant disclosure.
Figure 6:
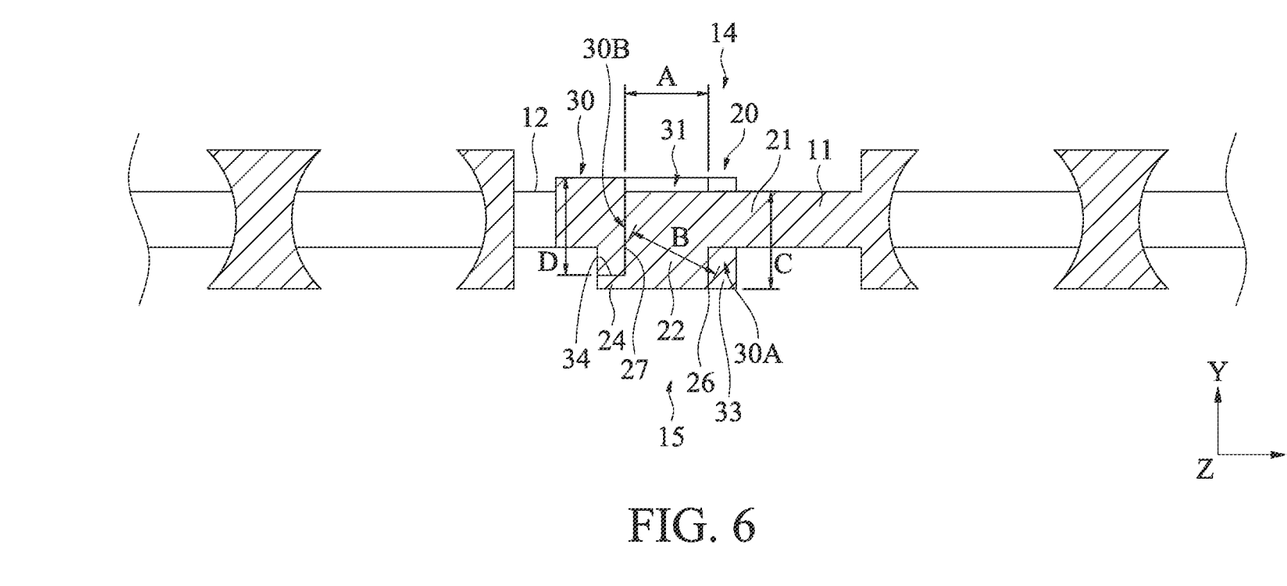
FIG. 6 illustrates a cross-sectional view (2) of the engaged state of the ball retainer according to the first embodiment of the instant disclosure.
Figure 7:
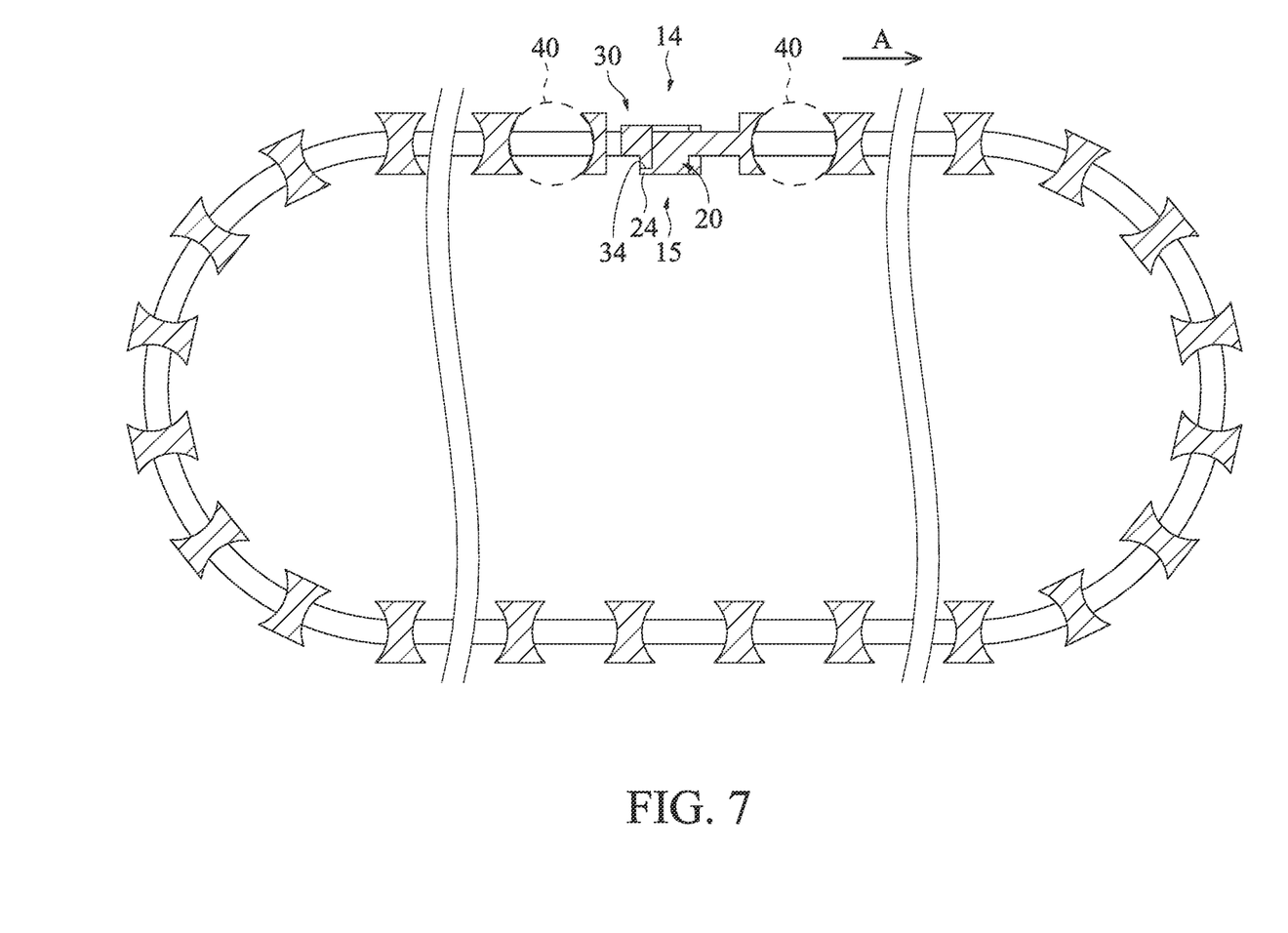
FIG. 7 illustrates a schematic view (1) of the engaged state of the ball retainer according to the first embodiment of the instant disclosure.
Figure 8:
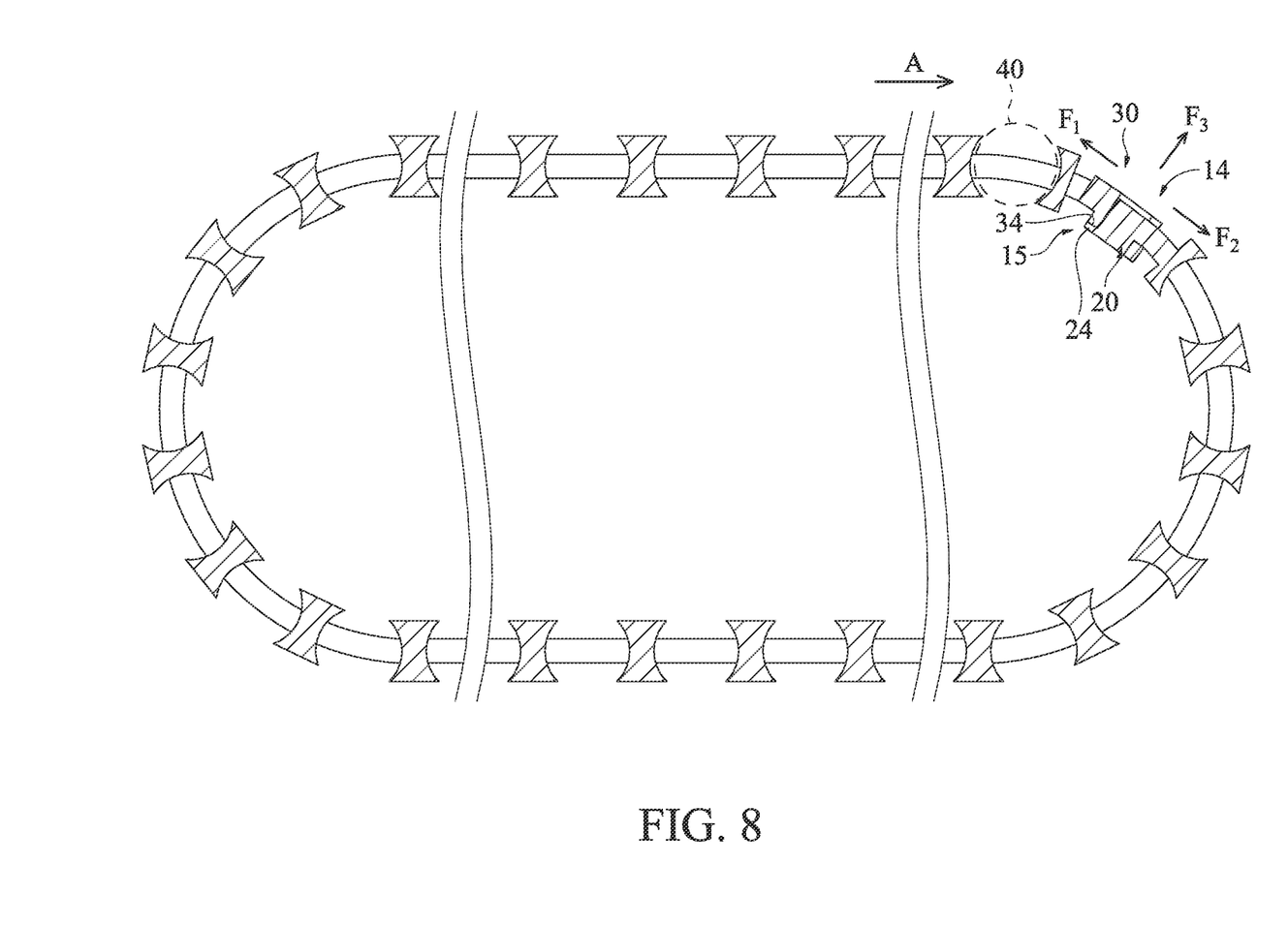
FIG. 8 illustrates a schematic view (2) of the engaged state of the ball retainer according to the first embodiment of the instant disclosure.

Please refer to FIG. 1 to FIG. 8. FIG. 1 illustrates a schematic view of a chain belt of a ball retainer according to a first embodiment of the instant disclosure. FIG. 2 illustrates a schematic view of a hook of the ball retainer according to the first embodiment of the instant disclosure. FIG. 3 illustrates a schematic view of a slot portion of the ball retainer according to the first embodiment of the instant disclosure. FIG. 4 illustrates an engaged schematic view of the ball retainer according to the first embodiment of the instant disclosure. FIG. 5 illustrates a cross-sectional view (1) of an engaged state of the ball retainer according to the first embodiment of the instant disclosure. FIG. 6 illustrates a cross-sectional view (2) of the engaged state of the ball retainer according to the first embodiment of the instant disclosure. FIG. 7 illustrates a schematic view (1) of the engaged state of the ball retainer according to the first embodiment of the instant disclosure. FIG. 8 illustrates a schematic view (2) of the engaged state of the ball retainer according to the first embodiment of the instant disclosure. As shown in FIG. 1 to FIG. 3, in the first embodiment, a ball retainer 100 comprises a chain belt 10, a hook 20, and a slot portion 30.

Please refer to FIG. 1 to FIG. 3. The chain belt 10 has a first end 11 and a second end 12 respectively at two ends of the chain belt 10. A plurality of accommodating portions 13 is between the first end 11 and the second end 12. FIG. 1 illustrates a partial schematic view of the chain belt 10. The actual scenario for using the chain belt 10 is that, the accommodating portions 13 between the first end 11 and the second end 12 of the chain belt 10 are connected in series in a head to tail manner to form a long chain. Regarding the actual overall structure of the chain belt 10, FIG. 5 and FIG. 6 can be referred to. As shown in FIG. 6, in the first embodiment, the accommodating portions 13 of the chain belt 10 are used to accommodate the rolling elements 40, such as square beads or round beads.

As shown in FIG. 2 and FIG. 4, the hook 20 is arranged on the first end 11 of the chain belt 10. The hook 20 comprises a neck portion 21, a hook body 22, two leaning protrusions 23, and a limiting protrusion 24. The neck portion 21 extends outward from the first end 11 along a long side direction (X-axis direction) of the chain belt 10. The hook body 22 is connected to the neck portion 21, and a width of the hook body 22 along a short side direction (Y-axis direction) of the chain belt 10 gradually decreases from a side of the neck portion 21 to a direction away from the neck portion 21. As shown in FIG. 2, The hook body 22 is formed as a trapezoidal structure extending toward the long side of the chain belt 10. The two leaning protrusions 23 are arranged at a joint portion between the hook body 22 and the neck portion 21, and the two leaning protrusions 23 extend outward along the short side direction of the chain belt 10 toward two sides of the hook body, respectively. The limiting protrusion 24 extends outward from an end surface 25 of the hook body 22 away from the first end 11 of the chain belt 10 along the long side direction of the chain belt 10.

As shown in FIG. 3, the slot portion 30 corresponds to the hook 20 and is arranged on the second end 12 of the chain belt 10. The slot portion 30 comprises a slot 31, two abutting portions 32, a connecting portion 33, and a receiving portion 34. The slot 30 has an opening side 30A and a limiting side 30B opposite to the opening side 30A. The two abutting portions 32 and the connecting portion 33 are on the opening side 30A, and the two abutting portions 32 extend inward from the slot 31 along the short side direction of the chain belt 10. The connecting portion 33 is connected to the two abutting portions 32, and the receiving portion 34 is on the limiting side 30B.

Please refer to FIG. 4 to FIG. 6. Specifically, in this embodiment, when the hook 20 is to be engaged with the slot portion 30, as shown in FIG. 5, firstly, the hook body 22 is obliquely extended into the slot 31. Then, when the end surface 25 of the hook body 22 leans against the corner of the surface of the slot portion 30 facing the opening side 30A (the surface on the limiting side 30B). By pressing the hook 20, the limiting protrusion 24 is accommodated in the receiving portion 34. Next, the two leaning protrusions 23 enter the slot 31 along the two abutting portions 32, and thus allow the neck portion 21 to lean against the connecting portion 33. Therefore, as shown in FIG. 6, the engagement between the hook 20 and the slot portion 30 can be achieved. In addition, since the hook body 22 is a trapezoidal structure formed by gradually decreasing the width along the short side of the chain belt 10 from the side of the neck portion 21 to the direction away from the neck portion 21, a gap is thus between the hook body 22 and the slot 31 in the short side direction of the chain belt 10. In this way, when the hook body 22 is in the slot 31, the hook body 22 can be adjusted and positioned in the direction of the short side of the chain belt 10.

As shown in FIG. 6 to FIG. 8, after the hook 20 is correspondingly engaged with the slot portion 30, the hook body 22 is accommodated in the slot 31, the two leaning protrusions 23 correspondingly lean against surfaces of the two abutting portions 32 facing the limiting side 30B, the neck portion 21 leans against the connecting portion 33, and the limiting protrusion 24 is correspondingly accommodated in the receiving portion 34. Specifically, in this embodiment, as shown in FIG. 7 and FIG. 8, when the slot portion 30 drives the hook 20 to move in the device, taking the clockwise direction as an example, the travelling direction of the ball retainer is the clockwise direction shown by the arrow A, but the instant disclosure is not limited thereto. In other embodiments, the travelling direction may also be the counterclockwise direction. In this embodiment, when the chain belt 10 is running to a turning point or when a slight unsmooth movement occurs during the travelling, the chain belt 10 will be pulled by a force. As shown in FIG. 7, during the movement of the chain belt 10, when the first end 11 and the second end 12 are relatively separated from each other by the force, the two leaning protrusions 23 leans against the abutting portions 32. Moreover, the surface of the hook body 22 connected to the neck portion 21 also leans against the connecting portion 33 so as to effectively prevent the hook 20 from detaching out of the slot portion 30.

Further, in this embodiment, after the hook 20 is correspondingly engaged with the slot portion 30, an outer peripheral side 14 and an inner peripheral side 15 corresponding to the outer peripheral side 14 are formed. As shown in FIG. 8, when the hook 20 and the slot portion 30 move to the turning point, the first end 11 and the second end 12 will be more affected by the forces $F_1$, $F_2$ so as to be pulled by each other. Moreover, owing to the curved shape of the chain belt 10 at the turning portion, the turning portion of the chain belt 10 is also applied with a force F3 toward the direction of the outer peripheral side 14. Under this situation, the two abutting portions 32 and the connecting portion 33 withstand the force of the two leaning protrusions 23 and the hook body 22 and the elastic force of the chain belt 10 respectively. Further, the engaging force of the limiting protrusion 24 to the receiving portion 34 is approximately equal to the forces $F_1$, $F_2$ of the first end 11 and the second end 12 moving away from each other. In this way, the first end 11 and the second end 12 are thus limited from moving away from each other. In addition, since the limiting protrusion 24 is engaged with the receiving portion 34, the rotation and the movement of the hook 20 toward the outer peripheral side 14 is limited. Furthermore, the connecting portion 33 is affected by the force $F_3$ acting toward the direction of the outer peripheral side 14. However, since the neck portion 21 blocks the connecting portion 33, the movement of the slot portion 30 toward the outer peripheral side 14 is limited. That is to say, in this embodiment, the force $F_3$ jointly formed by the hook 20 and the connecting portion 33 can counteract with the engaging force of the limiting protrusion 24 engaged with the receiving portion 34 and the neck portion 21. In this way, the hook 20 is prevented from detaching out of the slot portion 30.

In this way, when the hook 20 and the slot portion 30 are pulled away from each other by the forces $F_1$, $F_2$, and are pulled by the force $F_3$ toward the outer peripheral side 14 at the turning point, the hook 20 can be prevented from detaching out of the slot portion 30. In addition, as shown in FIG. 8, the forces $F_1$, $F_2$, $F_3$ are only provided as examples, and other force may also be provided on the connection portion between the hook 20 and the slot portion 30. For example, the torque of the torsion force, the elastic force of the chain belt 10, and so on can prevent the hook 20 from detaching out of the slot portion 30.

In the first embodiment, the limiting protrusion 24 and the receiving portion 34 are on the inner peripheral side 15. In this way, when the ball retainer 100 travels in the clockwise direction and runs to the turning point, the engaged portion between the first end 11 and the second end 12 is bent toward the outer peripheral side 14 by the force. Since the limiting protrusion 24 is engaged to the receiving portion 34 of the inner peripheral side 15 and is limited to be at the inner peripheral side 15, the hook 20 cannot be affected by the force to detach out of the slot portion 30 easily. The limiting protrusion 24 and the receiving portion 34 are not limited to be at the inner peripheral side 15, other embodiments of the limiting protrusion 24 will be described in detail later.

As shown in FIG. 2 and FIG. 4, in the first embodiment, the chain belt 10 comprises a hollow portion 16 on the first end 11. The hollow portion 16 is deposed at the end of the chain belt 10 to increase the elasticity of the end of the chain belt 10. In this way, when the engaged portion is bent by the force, the end of the chain belt 10 has a certain amount of elastic deformation, which can produce elastic deformation with the force.

In the first embodiment, the chain belt 10, the hook 20, and the slot 30 are formed by covering an elastic material with a fiber material through injection molding. In this embodiment, the chain belt 10, the hook 20, and the slot portion 30 are for example made of plastic material, therefore, the hook 20 and the slot portion 30 have certain amounts of elastic deformation. When the ball retainer 100 is running in the device and the chain belt 10 is pulled by the force, elastic deformation occurs at the engaged portion. Further, the fiber material may be for example carbon fiber or glass fiber, and the plastic material is injection-molded to cover the fiber material so as to increase the structural strength of the chain belt 10, the hook 20, and the slot portion 30.

In the first embodiments, as shown in FIG. 6, an extension length A of the hook body 22 along the long side direction is 0.4 to 0.45 times the maximum distance of the accommodating portion 13 along the long side direction. A distance B from an end point 26 of the hook body 22 adjacent to the first end 11 side and on the inner peripheral side 15 to a positioning point 27 on the end surface 25 is 0.45 to 0.5 times the maximum distance of the accommodating portion 13 along the long side direction. In this embodiment, the positioning point 27 is the surface where the end surface 25 leans against the limiting side 30B when the hook 20 enters the slot portion 30. With the positioning point 27 as a fulcrum, the hook 20 is pressed to be engaged with the groove portion 30. Please refer to FIG. 5 again, when the hook body 22 obliquely extends into the slot 31, the end surface 25 of the hook body 22 leans against the corner of the surface of the slot portion 30 facing the opening side 30A (the surface on the limiting side 30B), and the limiting protrusion 24 leans against the position adjacent to the positioning point 27. Next, with the positioning point 27 as a fulcrum, the hook body 22 is pressed downward. Hence, when the limiting protrusion 24 is adjacent to the receiving portion 34, the hook body 22 is pressed along a clockwise direction shown in FIG. 5, so that the limiting protrusion 24 is engaged with the receiving portion 34. In this way, the two abutting protrusions 32 slide into the slot 31 along the two leaning protrusions 23, and the neck portion 21 leans against the connecting portion 33. In addition, regarding the dimensions of the hook body 22 and the slot portion 31, excessive volume may cause impact on the return channel of the rolling elements 40, thus affecting the rolling efficiency. Therefore, a thickness C of the hook body 22 is 0.475 to 0.525 times the maximum distance of the accommodating portion 13 along the long side direction, while a depth D of the slot 31 is 0.525 to 0.575 times the maximum distance of the accommodating portion 13 along the long side direction.

Figure 9:
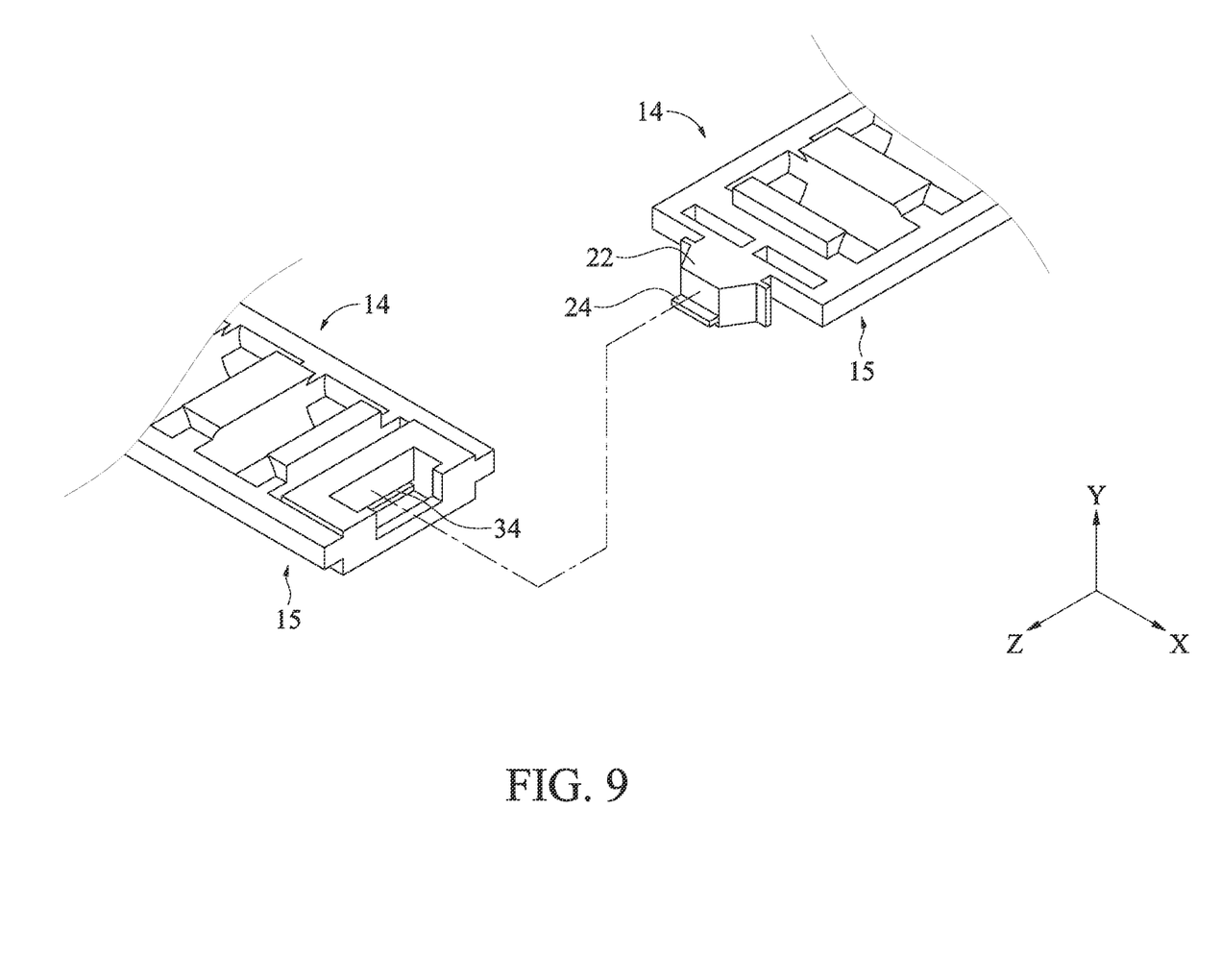
FIG. 9 illustrates an engaged schematic view of a ball retainer according to a second embodiment of the instant disclosure.

Please refer to FIG. 9. FIG. 9 illustrates an engaged schematic view of a ball retainer according to a second embodiment of the instant disclosure. In the first embodiment, the limiting protrusion 24 is at the bottom of the hook body 22 close to the inner peripheral side 15, but is not limited thereto. In the second embodiment, the limiting protrusion 24 can be disposed at a position adjacent to the inner peripheral side 15, and the receiving portion 34 is disposed corresponding to the limiting protrusion 24.

Figure 10:
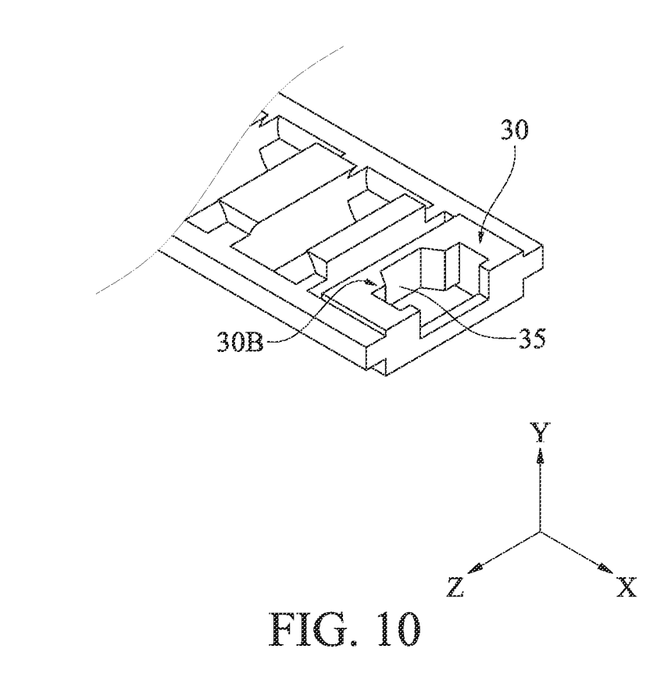
FIG. 10 illustrates a schematic view of a slot portion of a ball retainer according to a third embodiment of the instant disclosure.

Please refer to FIG. 2 and FIG. 10. FIG. 10 illustrates a schematic view of a slot portion of a ball retainer according to a third embodiment of the instant disclosure. In the third embodiment, the slot portion 30 further comprises a guiding recess 35 on the limiting side 30B, and the end surface 25 of the hook body 22 is slidably disposed on the guiding recess 35. In this way, when the hook 20 is to be engaged with the slot portion 30, the user can more intuitively align the hook body 22 with the guiding recess 35 to guide the hook 20 to be engaged with the slot portion 30. In addition, the guiding recess 35 is a trapezoidal slot corresponding to the shape of the hook body 22 so as to accommodate the end surface 25 of the hook body 22.

Figure 11:
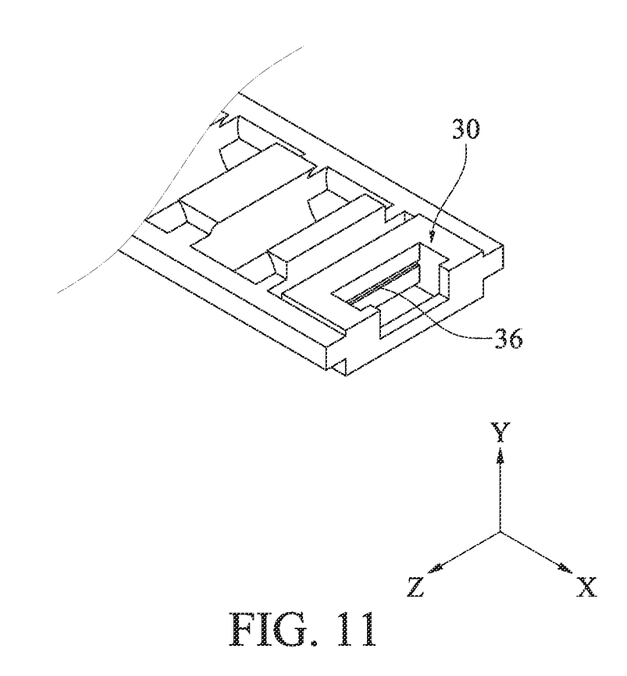
FIG. 11 illustrates a schematic view of a slot portion of a ball retainer according to a fourth embodiment of the instant disclosure.

Please refer to FIG. 6 and FIG. 11. FIG. 11 illustrates a schematic view of a slot portion of a ball retainer according to a fourth embodiment of the instant disclosure. In the fourth embodiment, the slot portion 30 has a positioning recess 36 corresponding to the positioning point 27. The positioning recess 36 is a slot extending along the short side of the chain belt 10 to allow the user to identify the proper position for pressing and engaging. When the hook 20 enters the slot portion 30 and the end surface 25 of the hook 20 is close to the positioning recess 36, the user can press the hook 20 to engage the hook 20 with the slot portion 30.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A ball retainer comprising:
   a chain belt having a first end and a second end opposite to the first end, and wherein a plurality of accommodating portions is between the first end and the second end;
   a hook arranged on the first end of the chain belt, wherein the hook comprises a neck portion, a hook body, two leaning protrusions, and a limiting protrusion; the neck portion extends outward from the first end along a long side direction of the chain belt; the hook body is connected to the neck portion, and a width of the hook body along a short side direction of the chain belt gradually decreases from a side of the neck portion to a direction away from the neck portion; the two leaning protrusions are arranged at a joint portion between the hook body and the neck portion, and the two leaning protrusions extend outward along the short side direction of the chain belt toward two sides of the hook body, respectively; the limiting protrusion extends outward from an end surface of the hook body away from the first end of the chain belt along the long side direction of the chain belt; and
   a slot portion corresponding to the hook and arranged on the second end of the chain belt, wherein the slot portion comprises a slot, two abutting portions, a connecting portion, and a receiving portion, wherein the slot has an opening side and a limiting side opposite to the opening side; the two abutting portions and the connecting portion are on the opening side, the two abutting portions extend inward from the slot along the short side direction of the chain belt, the connecting portion is connected to the two abutting portions, and the receiving portion is on the limiting side;
   wherein after the hook is correspondingly engaged with the slot portion, the hook body is accommodated in the slot, the two leaning protrusions correspondingly lean against surfaces of the two abutting portions facing the limiting side, the neck portion leans against the connecting portion, and the limiting protrusion is correspondingly accommodated in the receiving portion.

2. The ball retainer according to claim 1, wherein the slot portion further comprises a guiding recess on the limiting side, and the end surface of the hook body is slidably disposed on the guiding recess.

3. The ball retainer according to claim 1, wherein the chain belt further comprises a hollow portion on the first end.

4. The ball retainer according to claim 1, wherein the chain belt, the hook, and the slot are formed by covering an elastic material with a fiber material through injection molding.

5. The ball retainer according to claim 1, wherein each of the plurality of accommodating portions is configured to accommodate a rolling body.

6. The ball retainer according to claim 1, wherein after the hook is correspondingly engaged with the slot portion, an outer peripheral side and an inner peripheral side corresponding to the outer peripheral side are formed, and the limiting protrusion and the receiving portion are on the inner peripheral side.

7. The ball retainer according to claim 1, wherein an extension length of the hook body along the long side direction is 0.4 to 0.45 times a maximum distance of the accommodating portion along the long side direction.

8. The ball retainer according to claim 1, wherein after the hook is correspondingly engaged with the slot, an outer peripheral side and an inner peripheral side corresponding to the outer peripheral side are formed, and a distance from an end point of the hook body adjacent to the first end side and on the inner peripheral side to a positioning point on the end surface is 0.45 to 0.5 times a maximum distance of the accommodating portion along the long side direction.

9. The ball retainer according to claim 8, wherein the slot portion has a positioning recess corresponding to the positioning point.

10. The ball retainer according to claim 1, wherein a thickness of the hook body is 0.475 to 0.525 times a maximum distance of the accommodating portion along the long side direction.

11. The ball retainer according to claim 1, wherein a depth of the slot is 0.525 to 0.575 times a maximum distance of the accommodating portion along the long side direction.

* * * * *